March 26, 1946.

G. C. ARMSTRONG 2,397,116

CONTROL SYSTEM

Filed Aug. 15, 1944

WITNESSES:

INVENTOR
George C. Armstrong.
BY
ATTORNEY

March 26, 1946.　　　G. C. ARMSTRONG　　　2,397,116
CONTROL SYSTEM
Filed Aug. 15, 1944　　　2 Sheets-Sheet 2

WITNESSES:　　　　　　　　　　　　　INVENTOR
Edward Michaels　　　　　　　　George C. Armstrong.
　　　　　　　　　　　　　　　　　　　BY
　　　　　　　　　　　　　　　　Paul E. Friedemann
　　　　　　　　　　　　　　　　　　ATTORNEY Patented Mar. 26, 1946

2,397,116

UNITED STATES PATENT OFFICE 2,397,116

CONTROL SYSTEM

George C. Armstrong, Pittsburgh, Pa., assignor to Westinghouse Electric Corporation, East Pittsburgh, Pa., a corporation of Pennsylvania Application August 15, 1944, Serial No. 549,595

16 Claims. (Cl. 172—289)

My invention relates to control means for starting and resynchronizing synchronous motors.

A synchronous motor is usually started by operating it first as an induction motor. When the motor has accelerated close to synchronous speed, its secondary field connection is switched over to direct-current excitation in order to commence the synchronous operation proper. It is necessary to perform this switching operation at a properly selected instant relative to the operating cycle (i. e. slip voltage cycle) of the motor in order to prevent excessive line disturbance or excessive shock on the motor load and to obtain synchronization under torque conditions close to maximum pull-in torque.

It is an object of my invention to devise control means for the automatic synchronization of synchronous motors which perform a switching over from starting to running connections only under favorable speed, load, and torque conditions and by means of control devices of simple design and function as compared with the control systems heretofore available for such purposes.

It is also an object of my invention to equip synchronous motor starting controls with means for picking a proper synchronizing moment that avoid mechanically operating timing apparatus or other spring controlled mechanical sensing device, and to provide instead a type of sensing or timing apparatus operating on electric or electromagnetic timing principles.

A further object of my invention is to design synchronous motor starting controls which permit readily an adjustment or calibration of the timing effect so that the synchronizing moment relative to the cycle of the slip voltage can be chosen and changed in accordance with the characteristics and desiderata of each particular case of application.

In order to achieve these objects, my invention in one of its aspects involves a synchronizing relay whose magnetic circuit is of the retentive type and, hence, capable of holding its armature sealed against its stationary magnet structure once the magnetic circuit has been magnetized to a sufficient degree. According to my invention, I provide such a retentive relay with a magnetizing circuit which is periodically magnetized and thus sealed-in in dependence upon the motor speed. To this end, the magnetizing relay circuit is preferably connected to the discharge circuit of the motor field winding so that the relay is energized and thus sealed-in in dependence upon the current fluctuations induced in the field winding during the starting period of the motor. I further provide the retentive relay with a demagnetizing circuit of such current rating that a timed demagnetizing effect occurs each time the relay has picked up. The timing of the demagnetizing effect is so adjusted that the relay remains sealed as long as the frequency of the magnetizing impulses derived from the discharge circuit of the motor is too high to permit a full elapse of the timing period between successive magnetizing impulses. As a result, the retentive relay, upon magnetization and sealing due to discharge impulses, remains picked up until the motor speed is close to synchronism so that the interval between discharge impulses becomes longer than the timing period of the relay.

According to another feature of my invention, the demagnetizing and timing effect is produced by means of an alternating current which is so rated that the amplitude of the alternating magnetizing force caused thereby is small as compared with the amplitude of the magnetization caused by the discharge impulses so that a multiplicity of alternating-current cycles is necessary for reducing the remanent magnetism of the sealed-in relay to the drop-out value.

According to a further feature of the invention, the just-mentioned alternating-current circuit for demagnetizing and releasing the synchronizing relay is provided with an adjustable circuit device for selecting or calibrating the amplitude of the demagnetizing current in order to afford adjusting or changing the time characteristic of the relay in accordance with the requirements of each particular case of application.

In another aspect of my invention, the connection of the magnetizing relay circuit with the discharge or secondary connections of the synchronous motor extends through an electric valve, such as a single phase junction type rectifier, so that the pick-up and sealing performance of the relay is controlled by direct-current impulses which follow one another at the slip frequency of the motor. The polarity of the valve is so chosen that the switching over from starting to running connections of the motor, under control by the synchronizing relay, can occur only in the favorable or motoring phase positions of the rotor.

These and other objects and features of my invention will be apparent from the following description of the diagrams shown in the drawings, in which.

Figure 1:
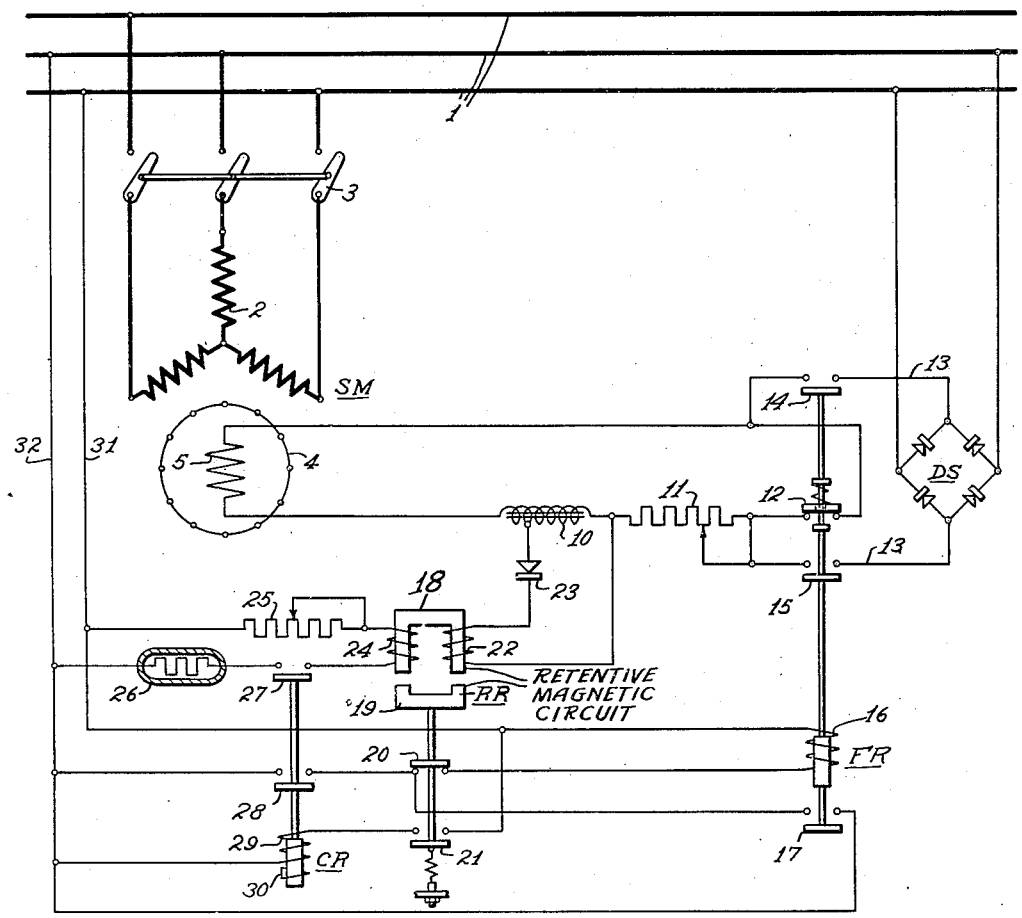
Figure 1 is a schematic illustration of a synchronous motor provided with synchronizing and resynchronizing control means according to the invention.

Referring to Fig. 1, numeral 1 denotes an alternating-current line. A synchronous motor SM has its primary winding 2 (armature winding) connected to the line 1 through a starting switch 3. The squirrel-cage type damper winding of the motor is denoted by 4 and the secondary or field winding by 5. The external circuit of field winding 5, i. e. the secondary circuit of the motor, extends through a transformer 10, here represented by an autotransformer, and includes a discharge resistor 11. The discharge or starting connection of the field circuit, is controlled by a contact 12 which forms part of a field relay FR. The field circuit is further provided with running connections 13 which are attached to a direct-current source DS consisting, for instance, and as shown, of a rectifier set which derives its energization from the alternating-current line 1. Two contacts 14 and 15 of field relay FR are provided for controlling the direct-current connections of the field winding.

The field relay FR has a control coil 16 for actuating the above-mentioned contacts 12, 14, and 15, and is also provided with a self-holding contact 17. When coil 16 is deenergized, the contact 12 closes the starting or discharge connection of the motor field winding 5. Upon energization of coil 16 contacts 14 and 15 are closed and an instant thereafter contact 12 is opened. By this operation the field winding 5 is switched over to the direct-current connections 13.

The field relay FR is controlled by a synchronizing relay RR. The stationary field structure of relay RR is denoted by 18. The appertaining armature 19 controls two contacts 20 and 21. The armature and contact assembly is normally biased toward the illustrated open position. This bias is effected either by gravity or by springs and, if desired, may be adjusted as shown. The magnetic circuit formed by parts 18 and 19 is retentive. That is, it contains material of relatively high residual magnetism so that it is capable of holding the armature 19 in attracted or sealed position in opposition to the armature bias merely by virtue of remanent magnetism. In order to obtain this effect, one or both of parts 18 and 19 may contain a portion of highly retentive steel, for instance, as used for permanent magnets. According to a preferred embodiment, the field structure 18 is composed of the customary non-retentive laminations, electrical sheet steel (such as silicon steel with about 2.5% silicon or electrical low carbon steel) while the armature 19 consists of laminated spring steel (or such magnetically hard material as carbon steel with 0.85% carbon and 0.25% manganese).

The field structure 18 carries a magnetizing coil 22 which is connected across all or part of transformer 10. The connection includes an electric valve 23, for instance, a single phase rectifier of the junction or disk type. A second coil 24 also inductively associated with the field structure 18, is connected in an alternating-current circuit which includes an adjustable impedance device, such as the illustrated rheostat 25, and a voltage regulating ballast tube 26. This circuit is controlled by the contact 27 of a control relay CR which has a second contact 28 and a control coil 29. The dropping out of relay CR may be slightly retarded by suitable mechanical or inductive damping means such as the illustrated short circuited winding 30. The alternating-current circuit of the demagnetizing winding 24 is connected by leads 31 and 32 to the line 1. The leads 31 and 32 serve also for energizing the coils 16 and 29 in the manner to be hereinafter described.

Before describing the control operation of the synchronizing system as a whole, it appears appropriate to first discuss the operation of the retentive synchronizing relay RR. The magnetic behavior of the magnetic circuit of this relay is represented schematically and in a somewhat simplified manner by the diagram of Fig. 2.

The coordinate system of this diagram indicates along its abscissa the magnetizing force as represented by the ampere turns of the magnetizing coils, while the ordinate indicates values of the magnetic induction caused in the magnetic circuit by the effect of the magnetizing force. Due to the fact that when the armature is picked up the air gap and hence the magnetic reluctance of the circuit is reduced, a higher induction is necessary to attract the armature from its dropped off position than to hold it sealed in against the stationary field structure once the armature has been picked up.

The residual magnetic induction or remanence necessary for sealing the armature in opposition to the opening tendency of the armature bias is represented by the value R2, and the magnetic induction of higher magnitude required for moving the armature from its off position toward the field structure is exemplified by the value R3. Let us assume that the relay is in dropped-off condition and that its magnetic circuit has retained some residual magnetism as denoted by the value R1. If now a magnetizing direct-current impulse is passed through the magnetizing winding 22, the magnetic circuit is energized as typified by the lower branch of the magnetizing characteristic M shown in Fig. 2. When the magnetizing force exceeds the value F1, corresponding to point B on curve M, the magnetic induction passes through the value R3 so that the armature is picked up. The maximum value of magnetizing force denoted by F2 corresponds to a point C of the magnetic characteristic M which is close to or within the range of saturation so that it produces an induction R5 substantially equal to the obtainable maximum induction.

Figure 2:
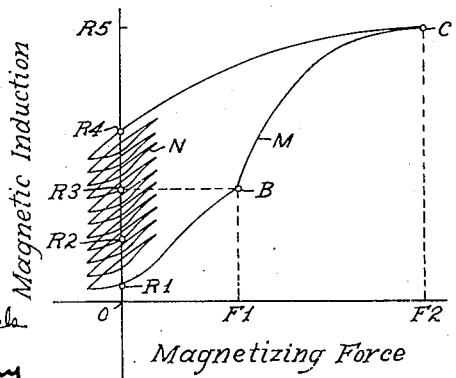
Fig. 2 is explanatory and shows schematically a magnetizing characteristic of the retentive synchronizing relay used in the system according to Fig. 1.

When now the magnetizing impulse declines to zero, the magnetic induction does not drop to the initial value of R1 but remains at the residual value R4 (remanence) due to the hysteresis of the magnetic circuit. Hence, upon cessation of a magnetizing current impulse, the relay remains magnetized so that the armature stays sealed in. The remanence R4, according to Fig. 2, is substantially in excess of the critical armature releasing value R2. Consequently, the demagnetizing effect required for releasing the armature must be sufficient to reduce the retentive magnetism from value R4 to just below R2. In order to obtain this result, an alternating current is passed through the demagnetizing winding 24. The amplitude of this current is so rated that the corresponding amplitude of the demagnetizing force (Fig. 2) is much smaller than that of the magnetizing impulse. As a result, a large number of alternating-current cycles is necessary in order to lower the retentive magnetism below value R2. The demagnetizing effect of such an alternating magnetization is represented by the curves N of Fig. 2. The demagnetization begins at the remanence value R4. During each hysteresis cycle produced by the alternating magnetization, a somewhat lower point along the ordinate is reached until the remanence drops below the value R2. When this takes place, the armature biasing force exceeds the retentive magnetic force so that the relay opens.

It will be understood from the foregoing that the demagnetizing release involves a timing effect whose duration depends on the number of alternating-current cycles necessary for reducing the remanent magnetism below the critical drop-off value. This number of cycles, in turn, depends on the amplitude of the alternating magnetizing force and hence on the rating of the alternating-current intensity. That is, the timing period increases with decreasing intensity of the demagnetizing alternating current, and hence can be adjusted within wide limits merely by varying the current intensity.

Keeping the just-mentioned behavior of the synchronizing relay RR in mind, the operation of the control system as a whole will be understood from the following description of a full sequence of operation.

In order to start the synchronous motor, the starting switch 3 is closed and thereby the primary winding 2 energized by three-phase alternating current from line 1. At first, all relays CR, RR, and FR are in the illustrated deenergized condition. By means of the damper winding 4 and the circuit of field winding 5 short-circuited through contacts 12, transformer 10 and discharge resistor 11, the motor starts running as an induction motor with the normal tendency to accelerate up to substantially synchronous speed. The frequency of the alternating current induced in field winding 5 and discharged through transformer 10 and resistor 11 is at first the same as the frequency of the line current, and decreases as the rotor accelerates. The alternating-current impulses in transformer 10 cause the magnetizing winding 22 to be energized by current impulses which, due to the function of valve 23, are unidirectional. The average integrated intensity of these impulses is approximately constant until the rotor comes very close to synchronous speed. Then this average intensity declines sharply. Each of the magnetizing impulses thus imparted to coil 22 is sufficient to magnetize the magnetic relay circuit up to the point exemplified by C in Fig. 2, which corresponds to maximum or nearly maximum magnetic induction. Consequently, the relay RR is immediately magnetized beyond the induction necessary for attracting and sealing its armature. In other words, relay RR picks up immediately.

As a result, the energizing circuit of coil 16 is opened at contact 20. This has no effect on the field relay FR because its coil circuit is at this stage interrupted at contacts 28 of relay CR. Simultaneously with the opening of contact 20, the contact 21 of relay RR is closed so that coil 29 of relay CR becomes energized. Relay CR picks up and closes contacts 27 and 28. The closure of contact 27 completes the alternating-current circuit of the demagnetizing coil 24 so that an alternating demagnetizing effect is produced as typified by curves N in Fig. 2. As mentioned in the foregoing, this effect has the result of releasing the armature assembly of relay RR if a given number of alternating cycles and hence a given timing period is permitted to elapse from the cessation of any individual direct-current magnetization produced by coil 22.

Figure 4:
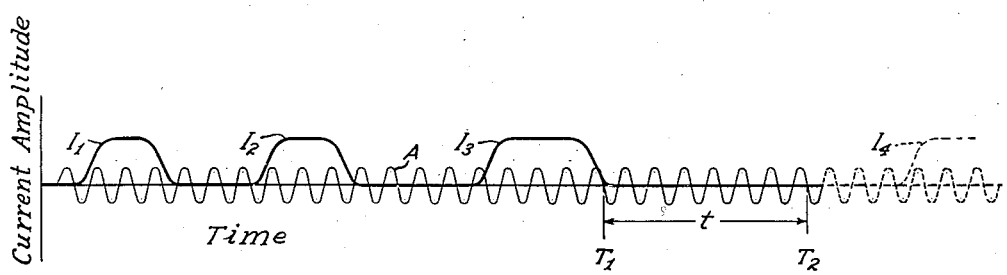
Fig. 4 refers to the retentive synchronizing relay according to Figs. 1 and 3 and represents schematically the current-time conditions of the magnetizing and demagnetizing impulses effective in the relay.

The just-mentioned conditions are represented by the diagram of Fig. 4 whose abscissa represents time, while the ordinate values indicate current intensities. The impulses denoted by $I_1$, $I_2$, $I_3$, and $I_4$ represent the magnetizing direct-current impulses imparted to the relay coil 22. The frequency of these impulses is high during the initial stage of motor acceleration. Consequently, the interval between the impulses, as exemplified by those denoted by $I_1$ and $I_2$, is too short to permit of a sufficient demagnetization by the alternating demagnetizing current. That is, before the synchronizing relay can drop off, a new magnetizing and sealing impulse occurs. As a result, both relays RR and CR stay sealed-in during the accelerating period of the motor, while the field relay FR remains deenergized and maintains the secondary motor circuit in starting condition.

As the motor approaches synchronous speed, the interval of time between successive impulses increases until it reaches a value larger than the timing period of the alternating demagnetizing effect. This is exemplified in Fig. 4 by the impulses denoted by $I_3$ and $I_4$. The impulse $I_3$ terminates at the instant $T_1$. From then on, a number of alternating-current cycles occur, extending over a total timing period $t$, until at the instant $T_2$ the residual magnetism in relay RR subsides below the critical value R2 so that the armature assembly drops off before the next magnetizing impulse $I_4$ can occur. The release of relay RR has the effect of closing its contact 20 in the coil circuit of the field relay FR while interrupting the energizing circuit of relay CR by opening the contact 21. At the closing moment of contact 20, the contact 28 of relay CR is still closed so that coil 16 of relay FR is energized and closes the self-holding contact 17. From then on, coil 16 remains energized through contacts 20 and 17 so that the subsequent opening of contact 28 remains ineffective as regards coil 16.

The energization of coil 16 has the effect of switching the secondary field circuit of the motor over to its running connections. The direct-current from source DS is applied to field winding 5 through contacts 14 and 15 and the field discharge circuit through resistor 11 is interrupted at contacts 12. The motor is immediately pulled into synchronism. Consequently, the discharge impulses cease so that the relay RR receives no further magnetizing impulse.

During synchronous operation of the motor, field relay FR remains energized while both relays RR and CR are deenergized. It will be noted that the transformer 10 remains connected in the direct-current circuit of field winding 5. Consequently, if a disturbance occurs which causes the motor to fall out of step, new impulses are induced in winding 5 and imparted to the magnetizing coil 22. If these impulses reach a sufficient magnitude to magnetize the magnetic circuit of relay RR beyond the value R3 (Fig. 2), the relay closes and thereby interrupts the energizing circuit of coil 16 at contact 20. This, in turn, causes the field relay FR to drop out and to switch the secondary motor circuit back to starting connections. The control system is now in the same condition as during the above-described starting operation. Consequently, the motor is automatically resynchronized by operating it as an induction motor until the interval between discharge impulses exceeds the length of the timing period of the synchronizing relay RR.

It is essential that the synchronization be effected during the motoring phase of the motor as compared with the generating half cycle. In accordance with this requirement, the polarity of the valve 23, and hence the phase position of the magnetizing impulses in coil 22, is so chosen that the switching operation, controlled by the release of the synchronizing relay, occurs always in the favorable (motoring) phase. It is further desired to complete the synchronization at a time point relative to the operating phase of the motor in which the pull-in torque is near its maximum. This requirement is taken care of by the fact that the interval between the cessation of a magnetizing direct-current impulse and the releasing moment of the synchronizing relay can be adjusted to a desired phase position by a proper rating of the alternating demagnetizing current. This adjustment is effected merely by dimensioning or adjusting the rheostat 25.

In order to obtain optimum accuracy and constancy of operation, it is, as a rule, desirable to apply an alternating demagnetizing current of substantially constant voltage. To this end the voltage regulating resistance tube 26 is employed in the embodiment shown in Fig. 1. It will be understood, however, that any other type voltage regulator may be used instead and that such regulating means may be omitted in cases where the available line voltage is sufficiently constant.

If the magnetic circuit of the synchronizing relay is so rated that it is magnetized substantially up to saturation by the direct-current impulses derived from the circuit of the motor field winding, differences in the current amplitude of these impulses have no appreciable effect on the residual magnetism and hence on the timing period of the relay. However, it is also possible to dimension the magnetic structure of the transformer 19 so that it is normally saturated and hence supplies impulses of substantially constant amplitude to the magnetizing coil of the synchronizing relay.

Figure 3:
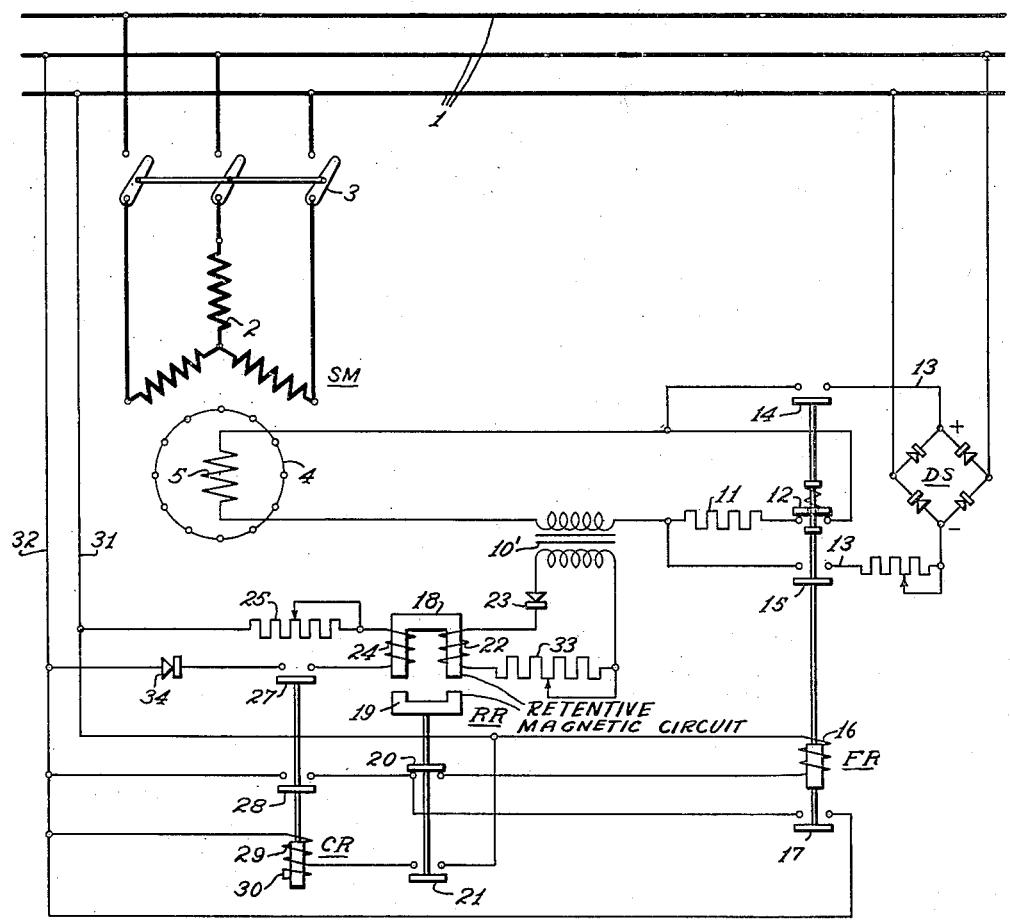
Fig. 3 is a diagrammatic showing of another synchronizing control system according to the invention.

The embodiment shown in Fig. 3 is similar to that of Fig. 1 with the exception of the magnetizing and demagnetizing circuits appertaining to the synchronizing relay RR. Therefore, only these modified parts and the adjacent circuit elements are specifically referred to hereinafter, all other parts being the same, and having the same reference characters respectively, as those shown in Fig. 1.

According to Fig. 3, the discharge resistor 11 is so arranged that it is fully disconnected when the circuit of field winding 5 is switched over to direct-current excitation. The transformer, here denoted by 19' is of the saturated core type and has a secondary winding connected to coil 22 of the synchronizing relay RR through an adjusting or calibrating rheostat 33. The demagnetizing circuit of the synchronizing relay contains a valve 34 so that the demagnetization is effected by intermittent direct current, the polarity being so chosen that the magnetizing force of coil 24 is in opposition to that of coil 22. The operation of this modified system is substantially the same as described in the foregoing with reference to Fig. 1, and it is also possible to adjust the timing effect of the demagnetizing circuit by means of a rheostat 25.

In view of the above exemplified possibility of modifying the control means according to my invention and since it will be understood by those skilled in the art that other changes can be made without departing from the gist and essential features of the invention as set forth in the claims attached hereto.

I claim as my invention:

1. With a synchronous motor having a field winding, in combination, a starting connection for discharging said winding during starting operation, a running connection for unidirectionally energizing said winding during synchronous running operation, control means disposed for switching said winding from said starting to said running connection and comprising a synchronizing relay having sealing-in means, a sealing-in circuit disposed between said starting connection and said sealing-in means and including an electric valve for imparting intermittent sealing-in impulses to said relay in accordance with the frequency of the current induced in said winding, timed releasing means for said relay having a timing period beginning after each of said impulses so that said relay is released for switching said winding from said starting to said running connection only when the interval between said impulses becomes longer than the timing period of said releasing means.

2. With a synchronous motor having a field winding, in combination, a starting connection and a running connection for said field winding, control means disposed for switching said winding from said starting connection to said running connection and comprising a synchronizing relay having a retentive magnetic circuit for sealing itself in by remanence upon sufficient magnetization, a magnetizing circuit disposed between said starting connection and said relay and including electric valve means for magnetizing said magnetic circuit by intermittent direct-current impulses in accordance with the frequency of the current induced in said winding, and timed demagnetizing means connected with said relay for reducing said remanence and having a timing period beginning after each of said impulses so as to release said synchronizing relay for switching said winding to said running connections only when the interval between said direct-current impulses becomes longer than the timing period of said demagnetizing means.

3. With a synchronous motor having a field winding, in combination, a starting connection and a running connection for said field winding, control means disposed for switching said winding from said starting connection to said running connection and comprising a synchronizing relay having a retentive magnetic circuit for sealing itself in by remanence upon sufficient magnetization, a magnetizing circuit inductively associated with said magnetic circuit, means for passing magnetizing current impulses through said magnetizing circuit at a frequency decreasing with increasing motor speed, and timed demagnetizing means connected with said relay for reducing said remanence and having a timing period beginning after each of said impulses so as to release said synchronizing relay for switching said winding to said running connections only when the interval between said direct-current impulses becomes longer than the timing period of said demagnetizing means.

4. With a synchronous motor having a field winding, in combination, starting and running connections for said field winding, a field relay for switching said winding from starting to running connections, a synchronizing relay disposed for controlling said field relay and having a retentive magnetic circuit so as to stay sealed in by remanent magnetism when magnetized, means for magnetizing said circuit intermittently at a frequency substantially proportional to the slip frequency of the motor, and means for gradually demagnetizing said circuit by a periodical demagnetizing force so as to release said synchronizing relay for placing said field relay in condition for running operation of said motor when a rated number of demagnetizing periods occurs between successive magnetizations.

5. With a synchronous motor having a field winding, in combination, starting and running connections for said field winding, a field relay for switching said winding from starting to running connections, a synchronizing relay disposed for controlling said field relay and having a retentive magnetic circuit so as to stay sealed in by remanent magnetism when magnetized, a magnetizing circuit extending between said starting connections and said synchronizing relay and containing an electric valve for magnetizing said magnetic circuit by intermittent direct-current impulses in accordance with the frequency of the current induced in said field winding during starting operation, and an alternating-current circuit connected to said relay for demagnetizing said magnetic circuit so as to release said synchronizing relay for placing said field relay in condition for running operation of said motor when a rated number of alternating current cycles occurs between successive direct-current impulses.

6. With a synchronous motor having a field winding, in combination, a discharge circuit for said winding, a transformer in said discharge circuit, means for supplying direct-current to said winding, a field relay for selectively closing said discharge circuit for starting operation and opening said circuit while connecting said direct-current supply means to said winding for running operation of said motor, a synchronizing relay disposed for controlling said field relay and having a retentive magnetic circuit so as to stay sealed in by retentive induction when magnetized and winding means inductively associated with said magnetic circuit for controlling its induction, a magnetizing circuit connected between said transformer and said winding means and containing valve means so as to magnetize said magnetic circuit by intermittent impulses of direct current in accordance with the frequency of the secondary current induced in said field winding, and a demagnetizing alternating-current circuit connected to said winding means for demagnetizing said magnetic circuit by alternating magnetization of rated amplitude so that said retentive relay is released for placing said field relay in condition for running operation only when a multiple number of alternating magnetizations, depending on the rating of said amplitude, occurs between successive direct-current impulses.

7. With a synchronous motor having a field winding, in combination, a starting connection for discharging said winding during starting operation, a running connection for unidirectionally energizing said winding during synchronous running operation, control means disposed for switching said winding from said starting to said running connection and comprising a synchronizing relay having sealing-in means, a sealing-in circuit disposed between said starting connection and said sealing-in means and including an electric valve for imparting intermittent sealing impulses to said relay in accordance with the frequency of the current induced in said winding, timed releasing means for said relay having a timing period beginning after each of said impulses so that said relay is released for switching said winding from said starting to said running connection only when the interval between said impulses becomes longer than the timing period of said releasing means, and adjusting means forming part of said releasing means for adjusting said timing period.

8. With a synchronous motor having a field winding, in combination, a starting connection for discharging said winding during starting operation, a running connection for unidirectionally energizing said winding during synchronous running operation, control means disposed for switching said winding from said starting to said running connection and comprising a synchronizing relay having sealing-in means, a sealing-in circuit for imparting intermittent sealing impulses to said relay in accordance with the slip frequency of the motor, timed releasing means for said relay having a timing period beginning after each of said impulses so that said relay is released for switching said winding from said starting to said running connection only when the interval between said impulses becomes longer than the timing period of said releasing means, and adjusting means forming part of said releasing means for adjusting said timing period.

9. With a synchronous motor having a field winding, in combination, a starting connection and a running connection for said field winding, control means disposed for switching said winding from said starting connection to said running connection and comprising a synchronizing relay having a retentive magnetic circuit for sealing itself in by remanence upon sufficient magnetization, a magnetizing circuit disposed between said starting connection and said relay and including electric valve means for magnetizing said magnetic circuit by intermittent direct-current impulses in accordance with the frequency of the current induced in said winding, and timed demagnetizing means connected with said relay for reducing said remanence and having a timing period beginning after each of said impulses so as to release said synchronizing relay for switching said winding to said running connections only when the interval between said direct-current impulses becomes longer than the timing period of said demagnetizing means, said demagnetizing means comprising an electric circuit for providing said relay with demagnetizing current, and adjustable impedance means in said latter circuit for rating said demagnetizing current so as to thereby adjust said timing period.

10. With a synchronous motor having a field winding, in combination, starting and running connections for said field winding, a field relay for switching said winding from starting to running connections, a synchronizing relay disposed for controlling said field relay and having a retentive magnetic circuit so as to stay sealed in by remanent magnetism when magnetized, a magnetizing circuit extending between said starting connections and said synchronizing relay and containing an electric valve for magnetizing said magnetic circuit by intermittent direct-current impulses in accordance with the frequency of the current induced in said field winding during starting operation, and an alternating-current circuit connected to said relay for demagnetizing said magnetic circuit so as to release said synchronizing relay for placing said field relay in condition for running operation of said motor when a rated number of alternating-current cycles occurs between successive direct-current impulses, and circuit means disposed in said alternating-current circuit for rating the amplitude of alternating current so as to thereby adjust said number of cycles.

11. With a synchronous motor having primary windings and a secondary field winding, in combination, circuit means for discharging said field winding during starting operation, circuit means for supplying direct current to said field winding during synchronous running operation, control means disposed for switching said field winding from one to the other of said circuit means and comprising a synchronizing relay having a retentive magnetic circuit so as to seal itself in by remanence upon magnetization, said relay having winding means inductively associated with said magnetic circuit for magnetizing and demagnetizing the latter, an electric circuit connecting said winding means with said discharging circuit means and including an electric valve for magnetizing said magnetic circuit intermittently by direct-current impulses in accordance with the frequency of the secondary current induced in said field winding, and an electric demagnetizing circuit connected to said winding means for energizing them by alternating current of the frequency of that of said primary windings and having circuit means for rating said alternating current so as to release said relay only when a number of alternating-current cycles, determined by said latter circuit means, elapses between successive direct-current impulses.

12. With a synchronous motor having a field winding, in combination, circuit means for discharging said field winding during starting operation, circuit means for supplying direct current to said field winding during synchronous running operation, control means disposed for switching said field winding from one to the other of said circuit means and comprising a synchronizing relay having a retentive magnetic circuit so as to seal itself in by remanence upon magnetization, said relay having winding means inductively associated with said magnetic circuit for magnetizing and demagnetizing the latter, an electric magnetizing circuit connecting said winding means with said discharging circuit means and including an electric valve for magnetizing said magnetic circuit intermittently by direct-current impulses in accordance with the frequency of the secondary circuit induced in said field winding, and an electric demagnetizing circuit connected to said winding means for energizing them by rated alternating current so as to demagnetize said magnetic circuit sufficiently for releasing said relay in order to switch said field winding to said running circuit means only when the interval between successive direct-current impulses becomes longer than the period of a substantially given number of alternating-current cycles, and voltage regulating means connected with said demagnetizing circuit for maintaining the voltage of said alternating-current substantially constant.

13. With a synchronous motor having a field winding, in combination, a resistance circuit for discharging said winding during accelerating operation, a direct-current circuit for energizing said winding during synchronous running operation, control means disposed for switching said winding from one to the other of said circuits and comprising a relay having a retentive magnetic circuit so as to seal itself in upon being magnetized, said relay having a magnetizing and a demagnetizing winding inductively joined with said magnetic circuit, said magnetizing winding being connected to said resistance circuit, valve means disposed between said magnetizing winding and said resistance circuit so that said magnetic circuit is magnetized by intermittent impulses in accordance with the frequency of the discharge current of said field winding, and alternating-current means connected with said demagnetizing winding for supplying it with rated demagnetizing current after each of said impulses in order to release said magnetic circuit for causing said relay to switch said field winding to said direct-current energizing circuit when the interval between said impulses becomes longer than a timing period determined by said rated current.

14. With a synchronous motor having a field winding, in combination, a resistance circuit for discharging said winding during accelerating operation, a transformer disposed in said discharge circuit, a direct-current circuit for energizing said winding during synchronous running operation, control means disposed for switching said winding from one to the other of said circuits and comprising a relay having a retentive magnetic circuit so as to seal itself in upon being magnetized, said relay having a magnetizing and a demagnetizing winding inductively joined with said magnetic circuit, said magnetizing winding being connected to said transformer, valve means disposed between said transformer and said magnetizing winding so that the latter is energized by impulses occurring in dependence upon the frequency of the discharge current of said field winding, and alternating-current means connected with said demagnetizing winding and including an impedance means for supplying the latter winding with demagnetizing current after each of said impulses in order to release said magnetic circuit for causing said relay to switch said field winding to said direct-current energizing circuit when the interval between said impulses becomes longer than a timing period determined by the impedance value of said impedance means.

15. With a synchronous motor having a field winding, in combination, a resistance circuit for discharging said winding during accelerating operation, a direct-current circuit for energizing said winding during synchronous running operation, a field relay for switching said winding from one to the other of said circuits, a synchronizing relay disposed for controlling said field relay and having a retentive magnetic circuit so as to seal itself in upon being magnetized, said relay having winding means inductively joined with said magnetic circuit, a transformer and an electric valve connecting said winding means with said resistance circuit for magnetizing and sealing said magnetic circuit by impulses recurring at a frequency depending on that of the current induced in said field winding, an alternating-current circuit connected to said winding means for demagnetizing said magnetic circuit by rated alternating current so as to release said synchronizing relay for placing said field relay in condition for running operation when the interval between said impulses increases beyond a time limit determined by the rating of said alternating current, and a control relay connected in said alternating-current circuit and controlled by said synchronizing relay so as to close said latter circuit only when said synchronizing relay is in sealed-in condition.

16. With a synchronous motor having a field winding, in combination, a resistance circuit for discharging said winding during accelerating operation, a direct-current circuit for energizing said winding during synchronous running operation, a field relay for switching said winding from one to the other of said circuits, a synchronizing relay disposed for controlling said field relay and having a retentive magnetic circuit so as to seal itself in upon being magnetized, said relay having winding means inductively joined with said magnetic circuit, a transformer and an electric valve connecting said winding means with said field winding for magnetizing said magnetic circuit by impulses recurring at a frequency depending on that of the current induced in said field winding, an alternating-current circuit connected to said winding means for demagnetizing said magnetic circuit by rated alternating current so as to release said synchronizing relay for placing said field relay in condition for running operation when the interval between said impulses increases beyond a time limit determined by the rating of said alternating current, said field relay and said synchronizing relay being interlocked so that said field relay returns to starting condition when said synchronizing relay is resealed by recurrence of impulses due to pulling-out of said motor.

GEORGE C. ARMSTRONG.